United States Patent Office 3,654,081
Patented Apr. 4, 1972

3,654,081
STARCH LIQUEFACTION PROCESS
Richard Vernon Vance, Florissant, Mo., Arthur Orville Rock, Edwardsville, Ill., and Paul Walter Carr, St. Louis, Mo., assignors to Miles Laboratories, Inc., Elkhart, Ind.
No Drawing. Continuation-in-part of abandoned application Ser. No. 622,395, Mar. 13, 1967. This application June 1, 1970, Ser. No. 42,492
Int. Cl. C12d *13/02*
U.S. Cl. 195—31 R 8 Claims

ABSTRACT OF THE DISCLOSURE

A process is disclosed by which starch can be easily and completely liquefied by adding calcium salts or calcium and sodium salts to an aqueous starch slurry which also preferably contains some alpha-amylase, passing the slurry mixture through a steam jet at a temperature of about 121° C. to 177° C., flash-cooling the hot mixture to about 93° C. to 102° C., adding some alpha-amylase, maintaining the mixture at this temperature for about 10–60 minutes, cooling the mixture to about 85° C., adding some alpha-amylase and maintaining the resulting mixture at this temperature until the mixture reaches a dextrose equivalent value of about 9 to 30. When crude starch is employed, the insolubles can be easily separated from the liquefied starch by filtration prior to any subsequent treatment of the liquefied starch.

The application is a continuation-in-part of application Ser. No. 622,395, filed on Mar. 13, 1967 now abandoned.

BACKGROUND AND OBJECTS OF THE INVENTION

It is well known in the art that starch, such as corn starch, has many uses. For many of these uses the starch must be in a solution or liquefied form. It is known that starch can be somewhat liquefied by heat. Temperatures of up to about 150° C. (300° F.) have been employed for such gelatinization or liquefaction, but the resulting products readily retrograde to form undesirable insoluble compounds. It is also well known that starch can be hydrolyzed to form sugars such as dextrose. This hydrolysis reaction can be employed for starch liquefaction. Acids, such as hydrochloric acid, have been widely used to catalyze such hydrolysis. Such "acid-converted" starch products have the disadvantage, however, that they contain undesirable amounts of reversion sugars such as gentiobiose, isomaltose, panose and the like. These reversion sugars are unfermentable by yeast, for example, and thus reduce the potential utility of acid-converted starch products as fermentation substrates for the production of other useful products.

In an effort to overcome the disadvantages of acid conversion, the art substituted an enzyme conversion. Enzymes, such as alpha-amylase, were employed to catalyze the starch hydrolysis. Even the use of enzymes for starch liquefaction had the disadvantage that an undesirably high amount of insoluble material still remained after liquefaction. Presence of more than trace amounts of this insoluble material, which is mostly gelatinized starch, made filtration after alpha-amylase treatment impractical. The prior art liquefaction procedures have been limited to slurry contents of less than about 35 weight percent in order to reduce the formations of undesirable solids.

It is an object of the present invention to provide an enzyme process for starch liquefaction which liquefies substantially all the starch and produces a product which is substantially free of retrogradation products.

It is another object of the present invention to provide a starch liquefaction process in which any insolubles can be easily removed from the liquefied starch prior to any subsequent enzyme treatment.

It is still another object of the present invention to provide a liquefaction process which can be readily used with crude starch raw materials.

It is still another object of the present invention to provide an enzyme process for starch liquefaction which can be readily adapted for continuous operation.

It is a further object of the present invention to provide a starch liquefaction process that can employ high solids content.

DESCRIPTION OF THE INVENTION

In accordance with the present invention, a process is provided for liquefaction of starch which comprises the steps of (1) adding to an aqueous slurry of starch-containing material an amount of a water-soluble calcium compound sufficient to provide a calcium content molarity of from about 0.003 to about 0.03 and rapidly heating the resulting mixture to a temperature of from about 121° C. (250° F.) to about 177° C. (350° F.) to gelatinize the starch-containing material; (2) cooling the gelatinized starch-containing material to a temperature of from about 93° C. (200° F.) to about 102° C. (215° F.), adding alpha-amylase and maintaining the resulting mixture at a temperature of from about 93° C. to about 102° C. for from about 10 minutes to about 60 minutes; (3) cooling the mixture to about 85° C. (195° F.), adding alpha-amylase and maintaining the resulting mixture at about 85° C. until the mixture reaches a dextrose equivalent value of from about 9 to about 30. As used herein, the expression "dextrose equivalent" means the reducing sugars content, expressed as dextrose, determined by well known procedures. Preferably, the process of the present invention employs an aqueous slurry of starch-containing material containing from about 35 to about 45 weight percent dry solids.

The total amount of alpha-amylase added is equivalent to from about 0.05 to about 0.25 weight percent, based on dry solids weight in the starch slurry, of an alpha-amylase having an activity of from about 3500 to about 5500 SKB units per gram of enzyme. The activity is measured according to the procedure described in Cereal Chemistry, vol. 43, pp. 336–342 (1966). While the alpha-amylase need only be added in two portions, the alpha-amylase is preferably added in three portions. The first portion is added in step (1) prior to rapid heating of the slurry and consists of from about 0 to about 30 weight percent of the total weight of added alpha-amylase. The second portion is added in step (2) and consists of from about 10 to about 50 weight percent of the total weight of added alpha-amylase. The third portion is added in step (3) and consists of from about 30 to about 60 weight percent of the total weight of added alpha-amylase.

The starch-containing materials used in the present process can be substantially pure starches or they can be crude starch-containing materials. As to the purified starches, they can be obtained from corn, wheat, potatoes, sorghum and the like. Crude starches from corn, wheat, potatoes, sorghum and the like can also be used. Various streams from both wet and dry starch milling processes can also be used. These streams include such materials as starch liquors, ground whole corn, corn flour, brewer's grits, centrifuge streams, clarifier underflow and degermed primary mill stream slurries. Various other crude starch materials with which the art is familiar can likewise be used. When crude starch materials are employed, the insoluble residue (fiber, protein, fat, etc.) can be easily separated from the liquefied starch by either filtering or centrifuging prior to any subsequent use or treatment of the liquefied starch.

The alpha-amylase used in this process is well known in the art and can be obtained from bacterial sources by well known procedures.

It has been found that the stability of the enzymes during this process is markedly improved when the starch slurry contains water-soluble calcium compounds. The calcium compounds can be added in various ways. The liquefaction process of the present invention is carried out at a pH of from about 5.7 to about 7.5. Preferably the pH is about 6.2. One process variation is to add calcium hydroxide, for example, to achieve the desired calcium content molarity of from about 0.003 to about 0.03 and also achieve the desired pH. Another process variation is to add the calcium compound, such as calcium chloride, in an amount partially to achieve the desired calcium content molarity, and then to add another calcium compound, such as calcium hydroxide, to achieve the desired calcium molarity and the desired pH.

Any water-soluble calcium compound, such as calcium acetate, calcium chloride, calcium citrate, calcium hydroxide, calcium hypophosphite, calcium lactate, and the like can be used. Calcium chloride and calcium hydroxide are the preferred calcium compounds to be used in this process.

It has also been found suitable to employ a mixture of water-soluble calcium and sodium compounds in this process. When the sodium compounds are employed, they should be present in such amount that the resulting starch slurry has a sodium content molarity of from about 0.0018 to about 0.12 and the molar ratio of sodium to calcium in said slurry is from about 0.6/1 to about 4/1. The preferred concentrations are a calcium molarity of about 0.005 and a sodium molarity of about 0.006.

The desired mixture of calcium and sodium compounds can be obtained in various ways. One process variation is to add calcium hydroxide, for example, to obtain the desired pH level, then add another water-soluble calcium compound, such as calcium chloride, to achieve the desired molarity content of calcium. A water-soluble sodium compound, such as sodium chloride, is then added to achieve the desired sodium molarity. Another process variation is to add the desired amount of calcium compound to achieve the desired calcium molarity content, add sodium hydroxide or sodium carbonate to obtain the desired pH level and then add sodium chloride, for example, to achieve the appropriate sodium molarity. Still another variation is to mix an aqueous solution of calcium compound, sodium compound and appropriate alkaline material and then add this mixture to the aqueous starch slurry to achieve the desired overall molarity and pH values.

Any water-soluble sodium compound can be used. Exemplary compounds are sodium acetate, sodium bicarbonate, sodium carbonate, sodium chloride, sodium citrate, sodium hydroxide, and the like. Sodium chloride and sodium hydroxide are sodium compounds preferred for use in this process.

In the first step of the process of this invention, an aqueous starch slurry containing the desired concentration of salts is rapidly heated in a steam jet to a temperature of from about 121° C. to about 177° C. If temperatures below about 121° C. are employed, there is incomplete gelatinization of the starch and thus incomplete liquefaction. If temperatures above about 177° C. are employed, the starch will begin to caramelize and produce undesirable products. Addition of alpha-amylase to the starch slurry prior to steam heating is preferred because it reduces the viscosity of the pasted mass resulting from the heating and permits easier addition of subsequent portions of enzyme to the starch mixture.

In the second step of the subject process, the heated, gelatinized starch is flash-cooled to a temperature of from about 93° C. to about 102° C. A portion of alpha-amylase is immediately added in order to prevent retrogradation of the gelatinized starch. The starch-enzyme mixture can then be held at a temperature in the range of about 93° C. to 102° C. for about 10 to about 60 minutes and then flash-cooled to about 85° C. or it can be gradually cooled to 85° C. over a period of about 20 to 60 minutes. In either event, the starch-enzyme mixture must be maintained in the temperature range of about 93° C. to 102° C. for at least about 10–20 minutes.

In the third step of the subject process, the partially liquefied starch from the second step at 85° C. is mixed with an added portion of alpha-amylase in order to complete the liquefaction. The amount of enzyme used and the time employed are governed by economics and by the dextrose equivalent values desired in the final liquefied starch product. Reaction time in this third step can be from about 30 minutes to about 3 hours. Conveniently, about 90 minutes is required to achieve a dextrose equivalent of about 9 to about 18. If the reaction time in this third step is extended to about 16–24 hours, the dextrose equivalent of the final liquefied product will be about 30. This product is especially useful for the production of commercial low D. E. syrup.

The liquefied starch solution obtained by the above described process can be used in various ways. It is especially useful as the raw material for an enzyme process for saccharification of starch to syrups or dextrose. In such saccharification step the enzyme amyloglucosidase is generally employed. The present process is particularly useful and preferred for use in the production of syrups or dextrose from crude starch materials. As mentioned above, prior art enzyme processes for liquefaction of starch produced non-filterable insolubles which interfered with subsequent saccharification processes. However, since the presence of non-amylaceous materials, especially fat, tends to inhibit amyloglucosidase activity, removal of insolubles from the liquefied starch prior to saccharification with amyloglucosidase is desirable. The present process enables insolubles to be easily separated from the liquefied starch prior to amyloglucosidase treatment. This enables increased overall production of dextrose to be obtained from a given starting quantity of starch.

The present invention has additional advantages. Enzyme liquefaction time has been reduced to about two hours from the general prior art liquefaction times of 2–24 hours. Recovered starch yields are also increased over those of prior art nezyme-liquefied starch.

The invention will be further described in the following examples.

EXAMPLE 1

Thirty-six pounds of refined corn starch (10% moisture) were mixed with 6 gallons (50 pounds) deionized water to form an aqueous slurry containing 37.7 weight percent dry solids. To the slurry were then added 19.6 grams of calcium chloride (75 weight percent $CaCl_2$) to form a calcium molarity content of 0.005. The pH was adjusted to a value of 7.0 by the addition of 5.84 grams of calcium hydroxide. The calcium molarity content based on the calcium hydroxide was 0.003 producing a total calcium molarity of 0.008. An alpha-amylase having a potency of about 3770 SKB units per gram was added to the slurry in an amount of 0.025 weight percent based on the starch dry solids weight. The starch slurry was then pasted (gelatinized) by passing it through a steam jet mixer at 138° C. (280° F.) and collecting it in a 30 gallon heat-jacketed vessel. The gelatinized starch was flash-cooled to a temperature of 99 to 100° C. (210 to 212° F.) with a second portion of the same enzyme was added in an amount of 0.075 weight percent based on the original starch dry solids weight. The mixture was then gradually cooled to 85° C. (185° F.) during a period of 20–30 minutes. A third portion of the same enzyme was added in an amount of 0.075 weight percent based on the original starch dry solids weight. The three portions of enzyme added represented, respectively, 14 weight percent, 43 weight percent and 43 weight percent of the total added enzyme. The starch mixture was then maintained at 85°

C. for 120 minutes at which time the liquefied starch had a dextrose equivalent of 14.3. No starch retrogradation was noted. The insoluble constituents of the liquefied starch coagulated readily and were rapidly removed by means of a small precoat filter. The filtration rate for the liquefied starch on a 2 in. x 18 in. drum filter was in excess of 367 ml./min. This is a substantial improvement in filterability of liquefied starch as compared to filtration rates as low as 17 ml./min. for prior art steam-heated single enzyme addition liquefaction procedures.

EXAMPLE 2

One hundred pounds of refined corn starch (about 10% moisture) were mixed with 17.2 gallons (142 pounds) of deionized water to form an aqueous starch slurry containing about 37 percent dry solids. To the slurry were then added 0.1 weight percent calcium chloride (based on dry substance starch) and 0.044 weight percent sodium hydroxide (based on dry substance starch) to adjust the pH to 6.7. The resulting starch slurry contained 0.0053 molar concentration of calcium and 0.0065 molar concentration of sodium. An alpha-amylase having a potency of about 3770 SKB units per gram was added to the slurry in an amount of 0.025 weight percent based on the starch dry solids weight. The starch slurry was then pasted by passing it through a steam jet mixer at 132° to 138° C. (270 to 280° F.). The gelatinized starch paste was flash-cooled to a temperature of 99 to 100° C. and was collected in a two gallon insulated tank provided with an efficient agitator. Alpha-amylase was continuously metered into the tank in a concentration of 0.1 weight percent based upon the starch dry solids present in the tank. The starch paste was retained in the tank for a nominal time of 4 minutes at 99 to 100° C. Overflow from this tank was pumped continuously into a further agitated reactor tank where it was retained at 99° to 100° C. for an additional 1 minutes. The resulting mixture was then cooled to 85° C. and 0.1 weight percent of the above alpha-amylase was added. The resulting mixture was then maintained at 85° C. for 90 to 120 minutes at which time the liquefied starch had a dextrose equivalent of 15 to 20. The filtration rate for this liquefied starch on the drum filter described in Example 1 was 367 ml./min. No starch retrogradation was noted.

EXAMPLE 3

The procedure of Example 2 was repeated using additions of 0.2 weight percent calcium chloride and 0.044 weight percent sodium hydroxide to the initial starch slurry. This resulted in a calcium molarity concentration of 0.011 and a sodium molarity concentration of 0.0065 for a sodium to calcium molar ratio of about 0.6/1. The final product had a dextrose equivalent of 15–20 and a filtration rate in excess of 367 ml./min.

EXAMPLE 4

The procedure of Example 2 was repeated using additions of 0.05 weight percent calcium chloride, 0.05 weight percent sodium chloride, and 0.044 weight percent sodium hydroxide to the initial starch slurry. This resulted in a calcium molarity concentration of 0.0027 and a total sodium molarity concentration of 0.011 for a sodium to calcium molar ratio of about 4/1. The final product had a dextrose equivalent of 15–20 and a filtration rate in excess of 367 ml./min.

EXAMPLE 5

Thirty-six pounds of refined corn starch (10% moisture) were mixed with 6 gallons (50 pounds) deionized water to form an aqueous starch slurry containing 37.7 weight percent dry solids. To the slurry were then added 29.4 grams of sodium chloride and 39.2 grams of calcium chloride (75 weight percent $CaCl_2$) to form a calcium molarity content of 0.01 and a sodium molarity content of 0.02. The pH was adjusted to a value of 6.2 with sodium carbonate. The amount of sodium carbonate added did not have an appreciable effect on the total sodium molarity content of the slurry. An alpha-amylase having a potency of 3770 SKB units per gram was added to the slurry in an amount of 0.0275 weight percent based on the starch dry solids weight. The starch slurry was then pasted (gelatinized) by passing it through a steam jet mixer at 141° C. (285° F.) and collecting it in a 30 gallon heat-jacketed vessel. The gelatinized starch was flash-cooled to 99° C.–100° C. (210°–212° F.) and a second portion of the same enzyme was added in an amount of 0.055 weight percent based on the original starch dry solids weight. The mixture was then gradually cooled to 85° C. (185° F.) during a period of 20–30 minutes. A third portion of the same enzyme was added in an amount of 0.055 weight percent based on the original starch dry solids weight. The three portions of enzyme added represented, respectively, 20 weight percent, 40 weight percent and 40 weight percent of the total added enzyme. The starch mixture was then maintained at 85° C. for 90 minutes at which time the liquefied starch had a dextrose equivalent of 15.3. No starch retrogradation was noted. The insoluble consituents of the liquefied starch coagulated readily and were rapidly removed by means of a small precoat filter. The filtration rate for the liquefied starch on a 2 in x 18 in. drum filter was 450 ml./min. This is a substantial improvement in filterability of liquefied starch as compared to filtration rates as low as 17 ml./min. for prior art steam-heated single enzyme addition liquefaction procedures. The process of the present invention results in substantially complete liquefaction of the starch. This is indicated by the following data. The insoluble residue in an aliquot portion of the liquefied starch was collected by vacuum filtration. After washing and drying, this residue was weighed and represented the equivalent of 0.9 weight percent of the total weight of the original dry solids in the starch slurry. This residue was analyzed and found to contain only 2.1 weight percent starch. The starch content of the residue in the liquefied starch thus represents only 0.02 weight percent of the total original dry solids indicating almost complete liquefaction of the starch.

EXAMPLE 6

Six hundred pounds of refined corn starch (containing 530 lb. dry solids and 70 lb. water) were mixed with 100 gallons (833 lb.) of tap water to form an aqueous starch slurry containing 37 weight percent dry solids. To the slurry were then added 490 grams of sodium chloride and 625 grams of calcium chloride (75 weight percent $CaCl_2$) to form a calcium molarity content of 0.01 and a sodium molarity content of 0.02. The pH was adjusted to a value of 6.2 with sodium carbonate. The pH was adjusted to a value of 6.2 with sodium carbonate. The amount of sodium carbonate added did not have an appreciable effect on the total sodium molarity content of the slurry. An alpha-amylase having a potency of 3770 SKB units per gram was added to the slurry in an amount of 0.0275 weight percent based on the starch dry solids weight. The starch slurry was then gelatinized by passing it through a steam jet mixer at 163° C. (325° F.) and collecting it in a heat-jacketed vessel. The gelatinized starch was held at 102° C. for an average of 15 minutes and then flash-cooled to 85° C. A third portion of the same enzyme was added in an amount of 0.055 weight percent based on the original starch dry solids weight. The gelatinized starch was held at 102° C. for an average of 15 minutes and then flash-cooled to 85° C. A third portion of the same enzyme was added in an amount of 0.055 weight percent based on the original starch dry solids weight. The three portions of enzyme added represented, respectively, 20 weight percent, 40 weight percent and 40 weight percent of the total added enzyme. The starch mixture was then maintained at 85° C. for an average of 90 minutes at which time the liquefied starch had a dextrose equivalent of 9.2. No starch retrogradation was noted. The passing of the starch slurry through the steam jet mixer and the holding periods were carried out continuously for 180 minutes. The portions of enzyme were continuously added as the starch reached the temperature of 102° C. and 85° C. This example clearly shows that the process may be practiced continuously.

EXAMPLE 7

A portion of crude starch material taken right after the third grind step in the corn wet-milling process was washed with water to remove soluble materials and then filtered. The wet filter cake containing 20.8 lb. dry solids was added to 3 gallons (25 lb.) of deionized water to form a slurry containing 29.6 weight percent dry solids. The dry solids contained 78.5 weight percent starch. To the slurry were then added 19.1 grams of sodium chloride and 25.5 grams of calcium chloride (75 weight percent $CaCl_2$) to form a calcium molarity content of 0.0078 and a sodium molarity content of .015. The pH was adjusted to a value of 6.2 with sodium carbonate. The amount of sodium carbonate added did not have an appreciable effect on the total sodium molarity content of the slurry. An alpha-amylase having a potency of 3770 SKB units per gram was added to the slurry in the amount of 2.625 grams (0.028 weight percent based on weight of dry solids in the slurry). The crude starch slurry was then gelatinized by passing it through a steam jet mixer at 165° C. (330° F.) and collecting it in a 30 gallon heat-jacketed vessel. The gelatinized crude starch was flash-cooled to 99° C. (210° F.) and 5.25 grams of the same enzyme were added (0.055 weight percent based on weight of dry solids in the crude starch slurry). The mixture was then gradually cooled to 85° C. during a period of 25 minutes. A 5.25 grams portion of the same enzyme was added (0.055 weight percent based on weight of dry solids in the crude starch slurry). The total enzyme added was 0.138 weight percent based on weight of dry solids in the crude starch slurry. The three portions of enzyme added represented, respectively, 20 weight percent, 40 weight percent and 40 weight percent of the total added enzyme. The mixture was held at 85° C. for 90 minutes at which time the liquefied crude starch had a dextrose equivalent of 14.5. Substantially all the starch was liquefied and no starch retrogradation was noted.

Use of the liquefied starch is described as follows. The liquefied crude starch was centrifuged to separate the non-amylaceous residue. The insoluble residue was 20 weight percent of the total weight of the original dry solids in the starch slurry. This residue contained only 0.6 weight percent starch. The supernatant liquefied starch was removed. It contained about 22 weight percent dissolved dry solids. It was evaporated to 40 weight percent dry solids. The pH was adjusted to 4.5, 1.25 weight percent of an amyloglucosidase (based on weight of starch dry solids) was added, and the resulting mixture was heated at 60° C. (140° F.) for 90 hours. The resulting saccharified starch had a dextrose equivalent of 96.5 and can be used as a dextrose syrup in known commercial processes. It can also be further refined to produce crystalline dextrose.

EXAMPLE 8

The procedure of Example 5 was repeated employing a temperature in the steam jet mixer of 164° C. (327° F.) and flash-cooling to 102° C. (215° F.) after steam mixing. The mixture was held at 102° C. for 18 minutes. The alpha-amylase had a potency of 4619 SKB units per gram and was used in three portions of 0.0125, 0.025 and 0.025 weight percent based on dry solids in the starch slurry. The total enzyme added was 0.0625 weight percent based on starch slurry dry solids. The three portions of enzyme added represented, respectively, 20, 40 and 40 weight percent of the total added enzyme. The liquefied starch product had a dextrose equivalent of 13.8. No starch retrogradation was noted, and the liquefied starch contained only 0.85 weight percent insoluble residue.

EXAMPLE 9

The procedure of Example 5 was repeated employing a temperature in the steam jet mixer of 140° C. (284° F.) and flash-cooling to 100° C. (212° F.) after steam mixing. The mixture was held at 100° C. for 18 minutes. The alpha-amylase had a potency of 4147 SKB units per gram and was used in three portions of 0.01, 0.025 and 0.050 weight percent based on dry solids in the starch slurry. The total enzyme added was 0.085 weight percent based on starch slurry dry solids. The three portions of enzyme added represented, respectively, 11.8, 29.4 and 58.8 weight percent of the total added enzyme. The liquefied starch product had a dextrose equivalent of 11.5. No starch retrogradation was noted.

EXAMPLE 10

The procedure of Example 9 was repeated wherein the three portions of enzyme used were 0.025, 0.01 and 0.050 weight percent, respectively, based on starch slurry dry solids. The three portions of enzyme added represented, respectively, 29.4, 11.8 and 58.8 weight percent of the total added enzyme. The liquefied starch product had a dextrose equivalent of 9.5. Slight starch retrogradation was noted.

EXAMPLE 11

The procedure of Example 5 was repeated employing a temperature in the steam jet mixer of 166° C. (330° F.) and flash-cooling to 99° C. (210° F.) after steam mixing. The mixture was held at 99° C. for 18 minutes. There was no enzyme added to the starch slurry prior to passing through the steam jet mixer. The alpha-amylase having a potency of 3770 SKB units per gram was added in portions of 0.055 weight percent based on starch slurry dry solids immediately after flash-cooling to 99° C. and after cooling to 85° C. The total enzyme added was 0.11 weight percent based on starch slurry dry solids. The enzyme added, on the basis of three portions, represented, respectively, 0, 50 and 50 weight percent of the total added enzyme. The liquefied starch product had a dextrose equivalent of 11.3. No starch retrogradation was noted.

EXAMPLE 12

The procedure of Example 5 was repeated using refined sorghum starch as the raw material. Results similar to those of Example 5 were obtained. This process can thus be employed with a wide variety of starch-containing materials.

EXAMPLE 13

Thirty-eight pounds of degerminated corn flour were washed with eight gallons of water. The wet cake (containing 33 lb. dry substance) was reslurried with 4 gal. (33 lb.) of deionized water to form a slurry containing about 35 weight percent solids. To the slurry were then added 29.4 grams of sodium chloride and 39.2 grams of calcium chloride (75 weight percent $CaCl_2$) to form a calcium molarity content of 0.0095 and a sodium molarity content of 0.018. The pH was adjusted to a value of 6.2 with sodium carbonate. The amount of sodium carbonate added did not have an appreciable effect on the total sodium molarity content of the slurry. An alpha-amylase having a potency of 3770 SKB units per gram was added to the slurry in the amount of 4.12 grams (0.0275 weight percent based on weight of dry solids in the slurry). The crude starch slurry was then gelatinized by passing it through a steam jet mixer at 164° C. (327° F.) and then collected in a 30 gallon heat-jacketed vessel. The gelatinized crude starch was flash-cooled to 100° C. (212° F.) and 8.23 grams of the same enzyme were added (0.055 weight percent based on weight of dry solids in the crude starch slurry). The mixture was then gradually cooled to 85° C. (185° F.) during a period of 30 minutes. An 8.23 grams portion of the same enzyme was added (0.055 weight percent based on weight of dry solids in the crude starch slurry). The total enzyme added was 0.1375 weight percent based on weight of dry solids in the crude starch slurry. The three portions of enzyme added represented, respectively, 20 weight percent, 40 weight percent and 40 weight percent of the total added enzyme. The mixture was held at 85° C. for 90 minutes, at which time the liquefied crude starch had a dextrose equivalent of 12.6. The liquefied crude starch was then divided into two portions. The first portion was filtered to remove the insoluble residue. The liquid remaining contained about 31 weight percent dissolved dry solids. The second portion was not filtered. Both portions were then treated equally in the following manner. The pH was adjusted to 4.5, 1.25 weight percent of an amyloglucosidase (based on weight of dissolved dry starch solids) was added and the resulting mixture was heated at 60° C. (140° F.) for 48 hours. After 48 hours the dextrose equivalent of the first portion was 96.4 while the dextrose equivalent of the second portion was only 90.6. The first portion product contained only 0.15 weight percent soluble protein based on weight of dry solids while the second portion product contained 0.57 weight percent soluble protein. Since the soluble proteins should be removed if crystalline dextrose is to be produced, it is clear that filtration of the liquefied starch prior to saccharification appreciably lowers the amount of soluble protein that must eventually be removed. The present process enables such filtration to be conveniently carried out.

In summary, the present invention relates to a starch liquefaction process employing three-stage heating and incremental enzyme addition. This process provides more complete starch liquefaction in a shorter processing period than that obtained by prior art procedures. An additional advantage of this process is that the liquefied starch can be easily filtered, for example, to remove insolubles prior to subsequent treatment if desired.

What is claimed is:

1. A process for liquefaction of starch which comprises (1) adding to an aqueous slurry of starch-containing material an amount of a water-soluble calcium compound sufficient to provide a calcium content molarity of from about 0.003 to about 0.03 and rapidly heating the resulting mixture to a temperature of from about 121° C. to about 177° C. to gelatinize the starch-containing material; (2) cooling the gelatinized starch-containing material to a temperature of from about 93° C. to about 102° C., adding alpha-amylase and maintaining the resulting mixture at a temperature of from about 93° C. to about 102° C. for from about 10 minutes to about 60 minutes; and (3) cooling the mixture to about 85° C., adding alpha-amylase and maintaining the resulting mixture at about 85° C. until the mixture reaches a dextrose equivalent value of from about 9 to about 30.

2. A process according to claim 1 wherein there is also added in step (1) an amount of a water-soluble sodium compound sufficient to provide a sodium content molarity of from about 0.0018 to about 0.12 and a molar ratio of sodium to calcium in said slurry of from about 0.6/1 to about 4/1.

3. A process according to claim 1 wherein the aqueous slurry of starch-containing material contains from about 35 to about 45 weight percent dry solids.

4. A process according to claim 1 wherein the total amount of alpha-amylase added is equivalent to from about 0.05 to about 0.25 weight percent, based on dry solids weight in the starch slurry, of an alpha-amylase having an activity of from about 3500 to about 5500 SKB units per gram of enzyme.

5. A process according to claim 1 wherein alpha-amylase is added in step (1) prior to rapid heating of the slurry, and wherein the alpha-amylase added in step (1) consists of from about 0 to about 30 weight percent of the total weight of added alpha-amylase, the alpha-amylase added in step (2) consists of from about 10 to about 50 weight percent of the total weight of added alpha-amylase, and the alpha-amylase added in step (3) consists of from about 30 to about 60 weight percent of the total weight of added alpha-amylase.

6. A process according to claim 1 wherein the calcium is present in a molarity amount of about 0.005 and the sodium is present in a molarity amount of about 0.006.

7. A process according to claim 1 wherein the calcium is present in a molarity amount of about 0.005 and the sodium is present in a molarity amount of about 0.006, the aqueous slurry of starch-containing material contains from about 35 to about 45 weight percent dry solids, and the total amount of alpha-amylase added is equivalent to from about 0.05 to about 0.25 weight percent, based on dry solids weight in the starch slurry, of an alpha-amylase having an activity of from about 3500 to about 5500 SKB units per gram of enzyme, said enzyme being added in three portions wherein the first portion is added in step (1) prior to rapid heating of the slurry and consists of from about 0 to about 30 weight percent of the total weight of added alpha-amylase, the second portion is added in step (2) and consists of from about 10 to about 50 weight percent of the total weight of added alpha-amylase, and the third portion is added in step (3) and consists of from about 30 to about 60 weight percent of the total weight of added alpha-amplase.

8. A process according to claim 1 wherein an insoluble residue is separated from the liquefied starch after step (3).

References Cited

UNITED STATES PATENTS

| | | | |
|---|---|---|---|
| 3,185,633 | 5/1965 | Krebs | 195—17 |
| 3,265,586 | 8/1966 | Land et al. | 195—31 |
| 3,280,006 | 10/1966 | Hurst et al. | 195—31 |
| 3,378,462 | 4/1968 | Denault et al. | 195—31 |
| 3,423,239 | 1/1969 | Goos | 195—31 X |

LIONEL M. SHAPIRO, Primary Examiner